United States Patent
Tazawa et al.

[11] Patent Number: 5,915,818
[45] Date of Patent: Jun. 29, 1999

[54] IMAGE INPUT APPARATUS

[75] Inventors: Masashi Tazawa, Kawasaki; Maki Suzuki, Ichikawa, both of Japan

[73] Assignee: Nikon Corporation, Tokyo, Japan

[21] Appl. No.: 08/839,343

[22] Filed: Apr. 18, 1997

[30] Foreign Application Priority Data

Apr. 19, 1996 [JP] Japan ................................ 8-098334
Mar. 31, 1997 [JP] Japan ................................ 9-080859

[51] Int. Cl.$^6$ ................................................ G03B 21/14
[52] U.S. Cl. ................................ 353/95; 353/25; 353/22
[58] Field of Search ................................ 353/25, 26 R, 353/26 A, 27 R, 27 A, DIG. 2, 22, 23, 95; 355/30, 68, 71; 339/507, 513

[56] References Cited

U.S. PATENT DOCUMENTS

| | | | |
|---|---|---|---|
| 3,942,885 | 3/1976 | Kool | 353/27 R |
| 4,363,538 | 12/1982 | Yokota et al. | 353/95 |
| 4,395,793 | 8/1983 | Wedel et al. | 355/30 |
| 5,020,900 | 6/1991 | Sashida et al. | 353/26 R |
| 5,268,563 | 12/1993 | Takenaka | 353/26 A |
| 5,647,654 | 7/1997 | Krzywdziak et al. | 353/27 R |

FOREIGN PATENT DOCUMENTS 5-075922 3/1993 Japan.
7-219029 8/1995 Japan.

*Primary Examiner*—William Dowling
*Attorney, Agent, or Firm*—Oliff & Berridge, PLC

[57] ABSTRACT

An improved image input apparatus 1 prevents foreign particles from attaching onto image reading areas of transparency media contained within the apparatus by providing feeding block structure 13 that substantially covers an area between a loading cartridge 11 and a take-up housing 15, except for a small slit-shaped window 13a formed in block 13 in a direction intersecting a direction of movement of the media through the block. The window 13a preferably has a sloping part 13d inclined toward a light axis L1 of an illumination system 12 that passes through the transparency media. The feeding block 13 may also be provided with a pressing member 13b that acts with rails 13c to press on the transparency media and prevent curling.

28 Claims, 5 Drawing Sheets

IMAGE INPUT APPARATUS

The disclosure of the following priority application is hereby incorporated by reference: Japanese Appl. No. 08-098334 filed Apr. 19, 1996.

BACKGROUND OF THE INVENTION

1. Field of Invention

The present invention relates to an image input apparatus that makes digital data from images on image bearing media such as photographic film.

2. Description of Related Art

Many types of image processing methods have become easier to perform by converting film images photographed by cameras into electronic data.

There is a known film scanner (Japanese Laid-Open Patent No. 5-75922) that serves as an image input apparatus for converting film images into electronic data.

FIG. 11 is a structural drawing showing this film scanner. As shown in FIG. 11, a film scanner 41 comprises a film feeding reel 43, a film loading component 44, a take-up reel 45, an imaging optical system 46, a two-dimensional image sensor 47, an image signal processing circuit 48, and video monitor 49. The imaging optical system 46 comprises an illumination unit 46a and an imaging lens unit 46b.

Photographic film 42 is loaded into the film loading component 44. The film feeding reel 43 feeds the photographic film 42. The fed photographic film 42 is taken up by take-up reel 45. The part from the film feeding reel 43 to the take-up reel 45 constitutes the film feeding system.

The two-dimensional image sensor 47 comprises a CCD image sensor. The image signal processing circuit 48 processes the image signals read by the two-dimensional image sensor 47 and video monitor 49 displays the images processed by image signal processing circuit 48.

In the structure described above, one frame of the photographic film 42 is positioned in a specified position of the imaging optical system 46 by being taken up by the take-up reel 45. In that condition, the transmitted images of the photographic film 42 illuminated by the illumination unit 46a are read by the two-dimensional image sensor 47.

Image reading is performed by projecting the transmitted images of the photographic film 42 onto light-receiving areas of the two-dimensional image sensor 47 through the imaging lens unit 46b. These read in images are processed by the image signal processing circuit 48, and then are displayed on the video monitor 49.

Due to the above construction, dust and other foreign particles tend to attach to the image reading areas of the photographic film.

As shown in FIG. 11, the upper surface of the photographic film 42 is in an open condition in the area below the imaging lens unit 46b. Therefore, foreign particles from the atmosphere tend to intrude. Also, when foreign particles exist on the image reading areas of the photographic film 42, the foreign particles end up being copied into the read in images.

SUMMARY OF THE INVENTION

The present invention was made to eliminate problems such as those described above, and aims to prevent foreign particles and the like from attaching onto the image reading areas of image bearing media.

The image input apparatus of the present invention comprises an illumination system that projects light onto image bearing media, a movement member that moves the media, a media feeding block formed so as to cover the media, a slit-shaped window formed in the feeding block in a direction intersecting the direction of movement of the media, and an image reader that reads the images of the media visible through the slit-shaped window. The slit-shaped window has a sloping part inclined toward a light axis illuminating onto the media. Consequently, two-dimensional image reading can be performed by reading the images while moving the media.

The image input apparatus also comprises an illumination system that projects light onto the media, a movement member that moves the media, a media feeding block formed so as to cover the media, a slit-shaped window formed in the feeding block in a direction intersecting the direction of movement of the media, a pressing member formed in the periphery of the slit-shaped window that presses the media, and an image reader that reads the images of the media visible through the slit-shaped window.

Consequently, the media moves while being pressed by the pressing member. Also, two-dimensional image reading can be performed by reading the images while moving the media.

BRIEF DESCRIPTION OF THE DRAWINGS

The invention is described with reference to the following drawings in which like numerals refer to like elements and wherein.

DETAILED DESCRIPTION OF PREFERRED EMBODIMENTS

Figure 1:
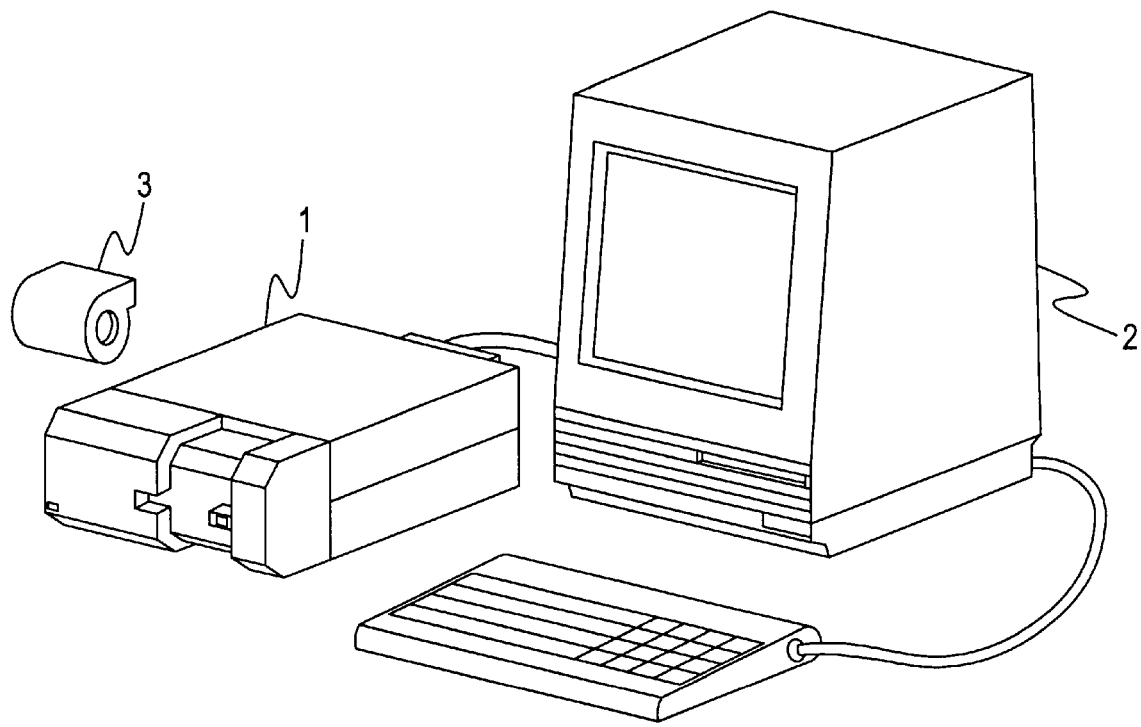
FIG. 1 is a perspective drawing showing the configuration of an image input system in a preferred embodiment of the present invention.

Preferred embodiments of the present invention are explained below, referring to the drawings.

FIG. 1 is a perspective drawing showing the structure of an image input system in a preferred embodiment of the present invention. As shown in FIG. 1, the image input system comprises an image input apparatus 1 and a computer 2. The operations of the image input apparatus, such as reading and the like, are controlled by the computer 2. The image input apparatus 1 optically reads images on a transparency, such as developed film inside a loaded film cartridge 3.

Figure 2:
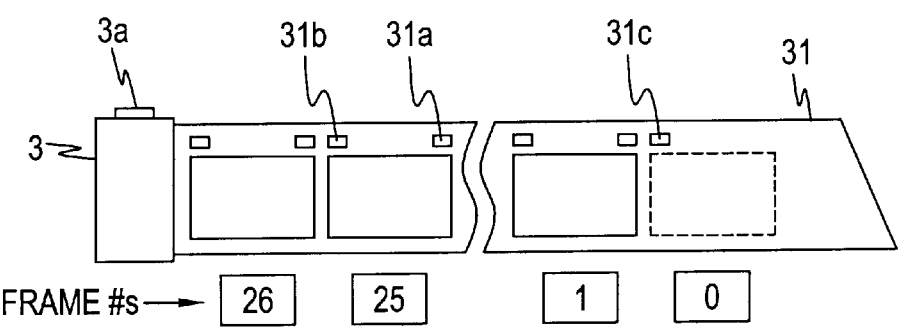
FIG. 2 is a top view of a typical film cartridge and film configuration.

As shown in FIG. 2, the film cartridge 3 houses film 31 fixed to a spool 3a. Film 31 is provided with two perforations 31a and 31b for each photographic frame. Also, before the first photographic frame, a null frame area (not photographed) is provided. The null frame area is provided with perforation 31c. An end perforation is provided after the last frame indicating that there are no photographic frames beyond that.

Figure 3:
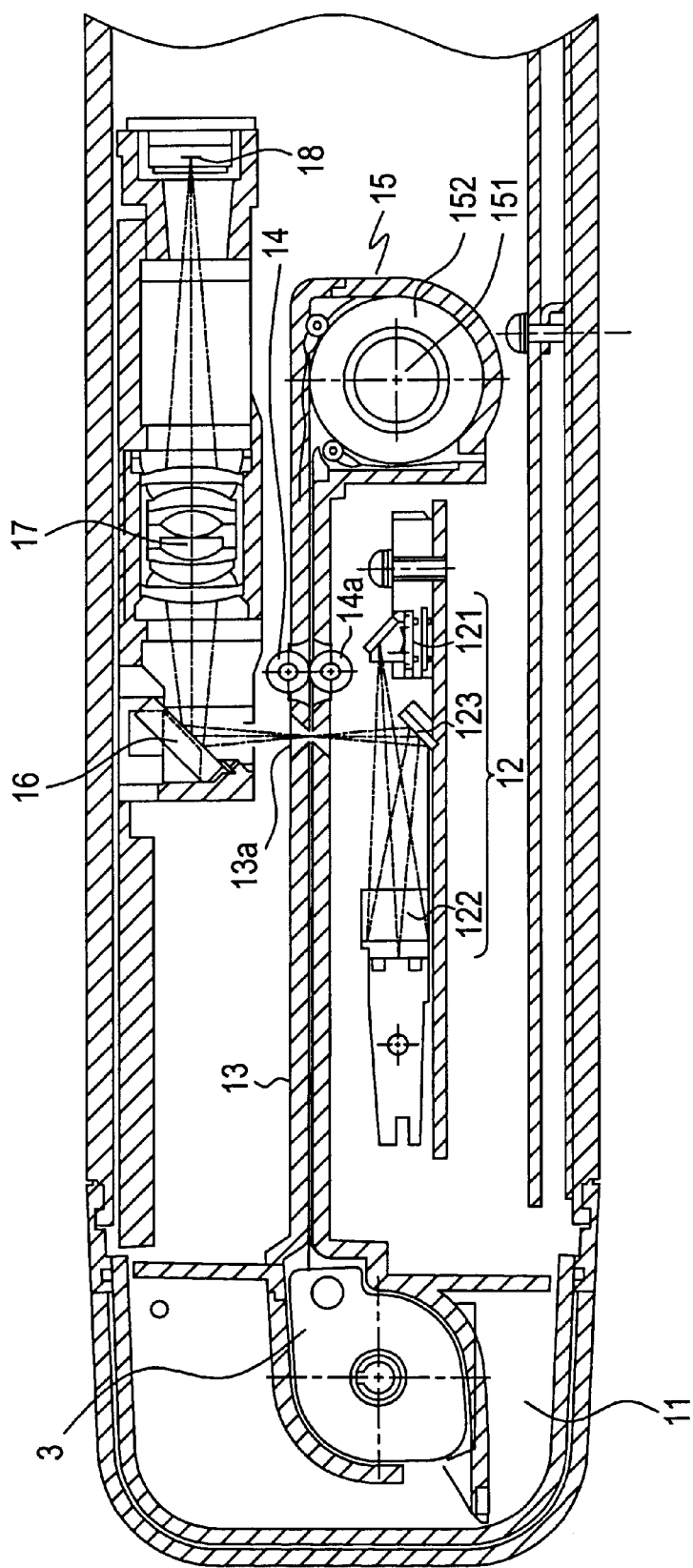
FIG. 3 is a partial cut away drawing showing a more detailed structure of the image input apparatus of FIG. 1.

FIG. 3 is a partial cut away view showing a more detailed structure of the image input apparatus 1. FIGS. 4–10 show a more detailed structure of window part 13a according to various embodiments of the invention.

As shown in FIG. 3, film cartridge 3 is loaded in cartridge loading chamber 11. An illuminating optical system 12 illuminates film 31. Media feeding block 13, which in the preferred embodiment is a photographic film feeding block, becomes a film guide when the film is fed from the film cartridge 3.

Film delivered to film feeding block 13 passes through a scan roller 14 and is delivered into a take-up housing 15. The delivered film 31 is taken up by a take-up spool 152. The take-up spool 152 is rotatably driven by a DC motor 151 (second drive source) capable of high-speed rotation. The scan roller 14 is driven to rotate by a step motor (first drive source). The film is fed by the rotation of the scan roller 14.

Film passing by a window 13a of the film feeding block 13 is illuminated by the illuminating optical system 12. Light transmitted through the window 13a is changed in direction by a 45-degree mirror 16 and is guided to a projection lens 17. Transmitted light from projection lens 17 is read into an image reader 18.

The illuminating optical system 12 includes an illumination source 121, a toric mirror 122, and a 40-degree mirror 123. Light projected by the illumination source 121 reaches the film, after being reflected by the toric mirror 122 and by the 40-degree mirror 123.

Images on the film passing by the window 13a illuminated by the illumination source 121 are projected onto the light-receiving surface of the reader 18, after being reflected by the 45-degree mirror 16 and passing through the projection lens 17. Reader 18 is preferably a one-dimensional image sensor that photoelectrically converts the introduced light into analog images. Detection of the perforations of the film 31 shown in FIG. 2 is also performed by reader 18.

Figure 4:
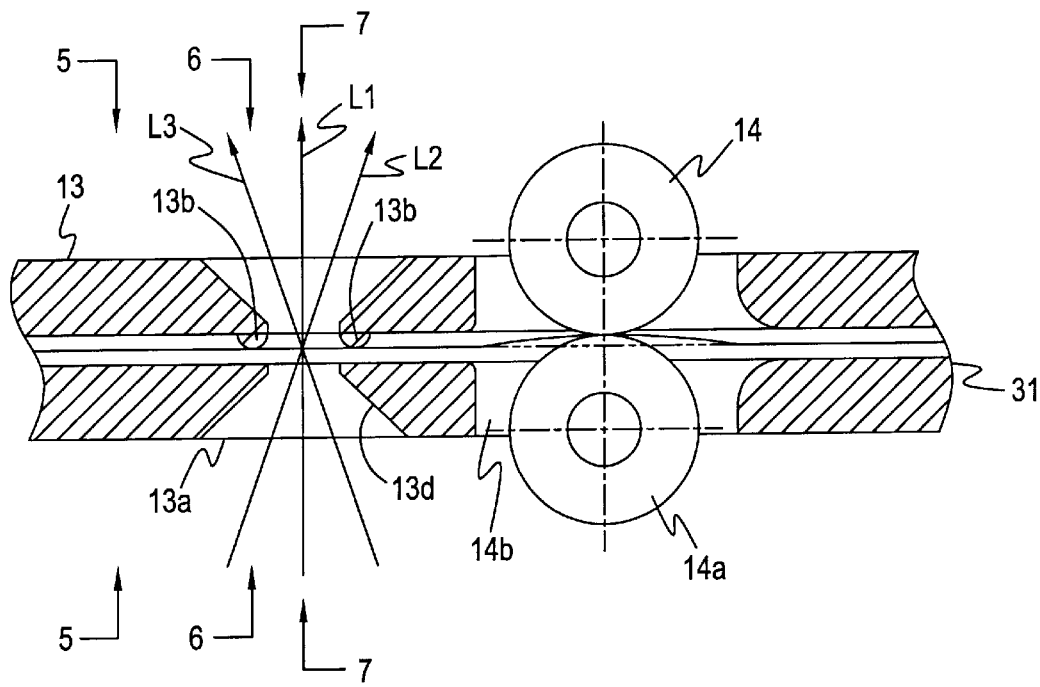
FIG. 4 is a partial cut away drawing showing a window of the image input apparatus.

As shown in FIG. 4, film pressing members 13b are positioned on sides of the window. Scan roller 14 and tension roller 14a are positioned in a window 14b part. Film 31 is fed inside the film feeding block 13.

Figure 5:
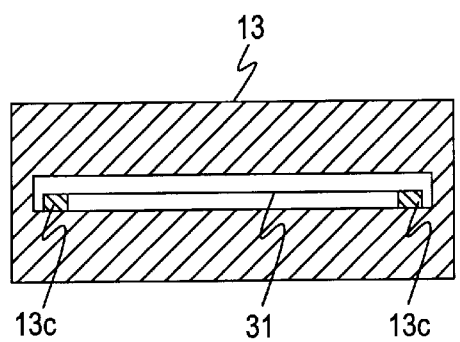
FIG. 5 is a sectional view of the image input apparatus of FIG. 4 taken along line 5—5.
Figure 6:
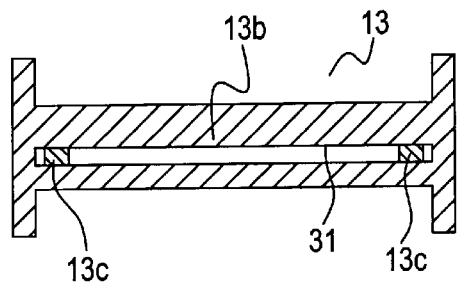
FIG. 6 is a sectional view of the image input apparatus of FIG. 4 taken along line 6—6.

As shown in FIGS. 5–6, rails 13c are formed on the lower surface of the film feeding block 13. These rails are placed parallel to the feeding direction of the film 31, preferably along edges of the film 31 as shown.

Figure 7:
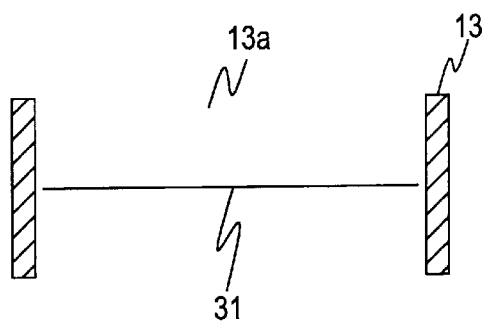
FIG. 7 is a sectional view of the image input apparatus of FIG. 4 taken along line 7—7.

The film feeding block 13, as shown in FIGS. 5–7, encompasses the surroundings of the film 31, except at the window 13a and the window 14b between the film cartridge loading chamber 11 and the take-up housing 15. FIG. 5 shows a sectional view of FIG. 4 along lines 5—5, FIG. 6 shows a sectional view of FIG. 4 along lines 6—6, and FIG. 7 shows a sectional view of FIG. 4 along lines 7—7.

As shown in FIG. 4, the film 31 is pressed toward the scan roller 14 by the tension roller 14a. The film 31 is fed by the rotation of the scan roller 14.

As film 31 is in contact with the film pressing components 13b and the rails 13c in the window part 13a, flexing of film 31 is eliminated.

Transmitted light taken into the projection lens 17 shown in FIG. 3, after passing by the window 13a, is read into reader 18. In a preferred embodiment, an axis extended from the optical axis of the projection lens 17 is defined as the optical axis of the reading optical system. When the optical axis becomes bent back by mirrors, the bent back axis is the optical axis. As is clear in FIG. 3, illumination source 121 is placed at one end of the optical axis of the optical system. The reader 18 is placed at the other end of the optical axis of the optical system. In FIG. 4, the optical axis is indicated by the arrow L1. Arrows L2 and L3 indicate the extent of the effective light beam. The light outside of the arrows L2 and L3 is blocked by a diaphragm placed within the lens group of the projection lens 17. Therefore, light outside of arrows L2 and L3 does not reach the reader 18.

Light illuminating the film 31, as shown in FIG. 3, is emitted from illumination source 121 constituting the illuminating optical system 12. The illumination source 121 may comprise LEDs or other suitable illumination elements. This emitted light is reflected by the toric mirror 122 and then reflected by the 40-degree mirror 123.

The window 13a has sloped parts 13d at its side walls placed at angles that diverge outward rather than being vertical. That is, the sloping parts 13d in window 13a are inclined toward the optical axis of the optical system of the image reader intersecting the film and parts 13d are formed as two diverging surfaces that define an increasing window width as they move away from the surface of the film along the optical axis.

Therefore, there is no invasion of the light reflected by these side walls into the direction of the reader 18. If the light reflected by the side walls were directed in the direction of the reader 18, needless shadows (ghosts) would become copied onto the read images.

Window 13a is formed in a long slit shape in a direction intersecting the feeding direction of the film 31. The size of the slit of this window 13a should be made about the size of the light-receiving area of the reader 18, which consists of a one-dimensional image sensor. Therefore, the film 31 fed inside the film feeding block 13 contacts the atmosphere outside the film feeding block 13 only at the area of this window 13a and the part of the window 14b.

The scan roller 14 and the tension roller 14a are positioned to be oppositely facing each other in window part 14b. The tension roller 14a presses the film 31 to the scan roller 14. In this condition, the scan roller 14 is driven to rotate, and the film 31 is fed.

The scan roller 14 and tension roller 14a may be eliminated in the case that the film 31 is moved by being taken up by the take-up spool 152. In such a case, there is no need to provide window 14b.

The images on the film passing by the window 13a illuminated by the illumination system are first reflected by the 45-degree mirror 16. Then, the optical images thus reflected pass through the projection lens 17 and are projected onto the light-receiving surface of the reader 18. The reader 18 performs perforation detection of the film 31. The projected images are photoelectrically converted by the reader 18, and are read in as image data.

While the image data is read only one-dimensionally in the main scanning direction by reader 18, two-dimensional image data is formed by reading images during the auxiliary scanning direction caused by the movement of the film.

In this manner, when performing image reading by moving in the direction of the film (auxiliary scanning direction) using the one-dimensional image sensor, a higher resolution reading becomes readily possible. That is, the resolution of the auxiliary scanning direction is determined by the speed of the auxiliary scan and the reading interval of the one-dimensional image sensor. The resolution of the main scanning direction is determined by the number of pixels of the one-dimensional image sensor in the main scanning direction.

As opposed to this, when using a two-dimensional image sensor, the readable resolution is restricted to its number of pixels. It is extremely difficult to increase the number of pixels in such a sensor. For example, when trying to perform image scanning at a resolution of 640×480 bits with a two-dimensional image sensor, a minimum of 640×480 pixels becomes necessary. Opposed to this, a one-dimensional image sensor may have one array of 640 pixels.

Thus, in scanned image reading, with a one-dimensional image sensor, higher resolution image reading becomes possible without incurring much cost.

As described before, when the film 31 (FIG. 4) is fed inside the film feeding block 13, the film contacts the external atmosphere only at the window part 13a and the window part 14b. Also, the reading of the images on the film 31 is performed only on the part visible through the slit-shaped window 13a.

Consequently, according to the present preferred embodiment, it is very difficult for foreign particles and the like to attach to the film 31. Also, it is extremely difficult for there to occur a condition of foreign particles being copied into the input image data.

Figure 8:
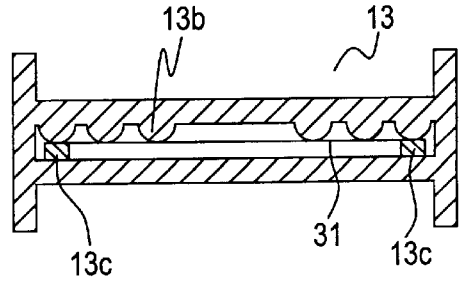
FIGS. 8–10 are alternative sectional views of the image input apparatus of FIG. 4 taken along line 6—6.

The section line 6—6 of FIG. 4 may alternatively be made as shown in FIG. 8. That is, rather than solid film press 13b, film presses 13b' of a spherical shape are formed at a specified interval.

By the above construction, the film 31 can be held down at multiple points with a small contact area. Consequently, curling of the film 31 is suppressed, and the sliding resistance of the film is reduced.

Figure 9:
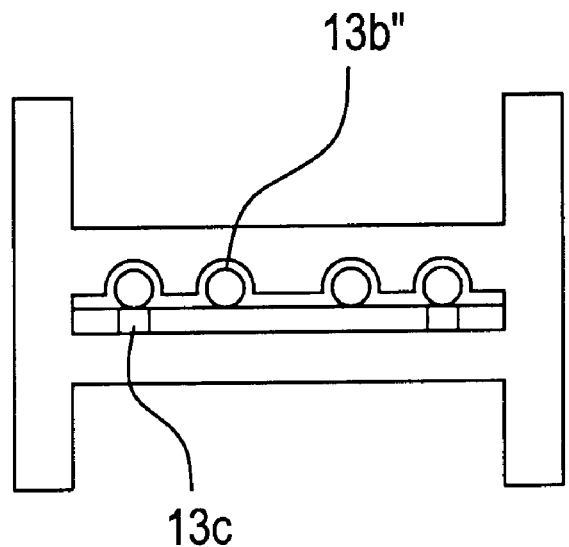

The section line 6—6 of FIG. 4 may also be made as shown in FIG. 9. That is, in the embodiment of FIG. 9, a plurality of ball bearings 13b" are placed in positions opposite the rails 13c in relation to the film 31. Also, several of the bearings 13b" are placed in positions off set from but facing the rails 13c. The film 31 moves in the auxiliary scanning direction in contact with the bearings 13b" and the rails 13c. The sliding resistance of the film and the component pressing the film is reduced by the rotation of the bearings 13b".

Figure 10:
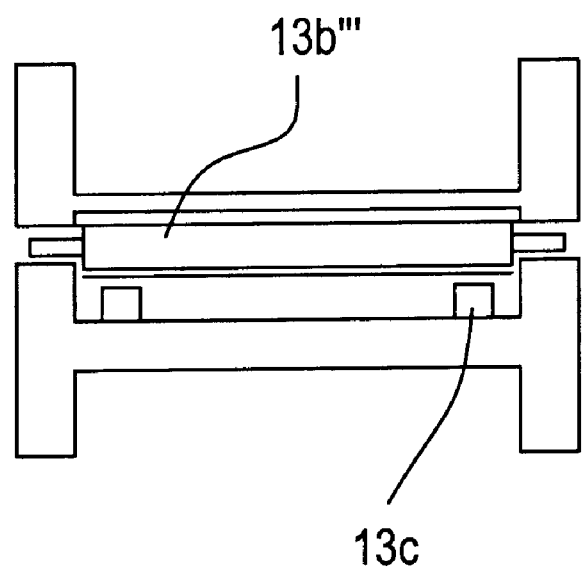
Figure 11:
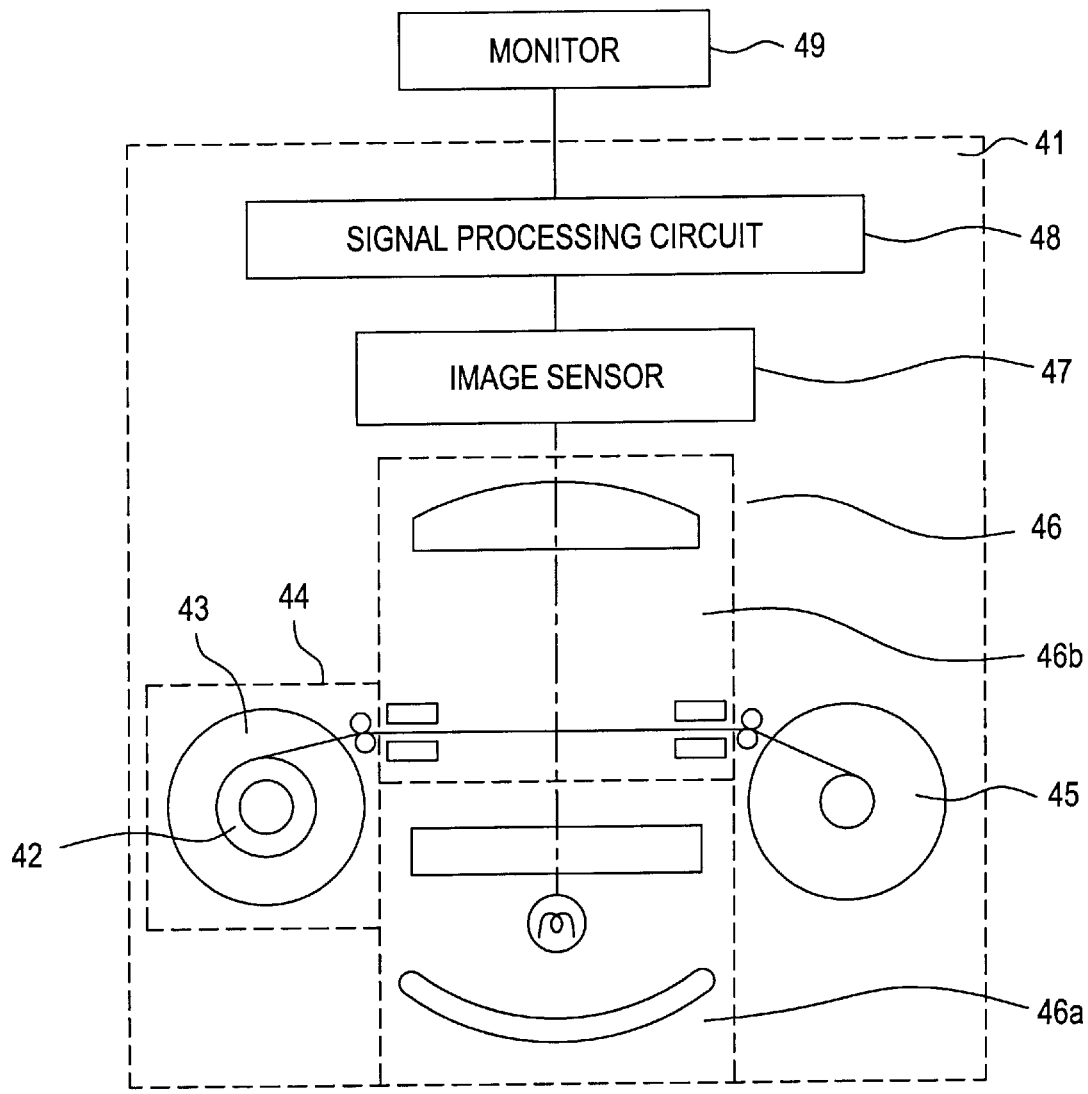
FIG. 11 is a structural drawing showing a conventional film scanner.

The section line 6—6 of FIG. 4 may also be made as shown in FIG. 10. That is, in the embodiment of FIG. 10, a roller 13b''' is placed in a position opposite the rails 13c in relation to the film 31 with parts of the roller 13b''' directly opposed to the rails 13c. As shown in FIG. 10, the roller 13b''' is supported by axial couplers outside the main scanning direction beyond the rails 13c. The film 31 moves in the auxiliary scanning direction in contact with the roller 13b''' and the rails 13c. The sliding resistance of the film and the component pressing the film is reduced by the rotation of the roller 13b'''.

As explained above, the present invention comprises an illumination system that projects light onto image bearing media, a movement member that moves the media, a feeding block formed so as to cover the media, a slit-shaped window formed in the feeding block in a direction intersecting the direction of movement of the media, and an image reader that reads the images of said media visible through the slit-shaped window. The slit-shaped window has a sloping part inclined toward the optical axis of the illumination system onto the media.

By the above, because the image reading area of the media is narrow, and the area outside of that is substantially covered by the feeding block, it has the effect that foreign particles and the like are not likely to attach onto the media.

Also, the image input apparatus of the present invention comprises an illumination system that projects light onto the media, a movement member that moves the media, a feeding block formed so as to cover the media, a slit-shaped window formed in the feeding block in a direction intersecting the direction of movement of the media, a pressing member formed in the periphery of the slit-shaped window that presses the media, and an image reader that reads the images of the media visible through the slit-shaped window.

By the above, because the image reading area of the media is narrow, and the area outside of that is substantially covered by the feeding block, it has the effect that foreign particles and the like are not likely to attach onto the media. In addition, the media is moved while being pressed by the pressing member. Therefore, curling of the media during image reading is effectively eliminated.

While this invention has been described in conjunction with specific embodiments thereof, many alternatives, modifications and variations will be apparent to those skilled in the art. Accordingly, the embodiments herein are intended to be illustrative and not limiting. Various changes can be made without departing from the spirit and scope of the invention as defined in the appended claims.

What is claimed is:

1. An image input apparatus, comprising:
   an illumination source that projects light onto a transparency;
   a movement member for moving said transparency in a movement direction;
   a transparency feeding block that holds and covers said transparency;
   a slit-shaped window formed in said transparency feeding block in a direction intersecting the direction of movement of said transparency;
   an image reader; and
   a projection optical system that projects light from said illuminated transparency to said image reader,
   wherein said slit-shaped window has a sloping part inclined toward an optical axis of said projection optical system intersecting said transparency.

2. The image input apparatus of claim 1, wherein said window has a first window opening width adjacent the transparency and said sloping part defines an increasing window opening width in a direction away from the transparency.

3. The image input apparatus of claim 1, wherein said movement member includes a window separate from said slit-shaped window for allowing engagement of said movement member with said transparency.

4. The image input apparatus of claim 3, wherein said movement member further includes a scan roller and a tension roller within said movement member window.

5. The image input apparatus of claim 1, wherein said transparency is photographic film.

6. The image input apparatus of claim 1, further comprising a transparency cartridge loading chamber and a take-up spool, said movement member moving said transparency from said transparency cartridge loading chamber to said take-up spool and said transparency feeding block extending between said cartridge loading chamber and said take-up spool.

7. An image input apparatus, comprising:
   an illumination source that projects light onto a transparency;

a movement member that moves said transparency in a movement direction;

a transparency feeding block that holds and covers said transparency;

a slit-shaped window formed in said transparency feeding block in a direction intersecting the direction of movement of said transparency;

a pressing member formed at the periphery of said slit-shaped window that presses said transparency; and an image reader that reads images on said transparency visible through said slit-shaped window.

8. The image input apparatus according to claim 7, wherein said pressing member is formed with a ball-shaped part contacting said transparency.

9. The image input apparatus of claim 7, wherein said movement member includes a window separate from said slit-shaped window for engaging said movement member with the transparency.

10. The image input apparatus of claim 9, wherein said movement member further includes a scan roller and a tension roller located within said movement member window.

11. The image input apparatus of claim 7, wherein said pressing member includes a rotating body.

12. The image input apparatus of claim 7, further comprising a transparency cartridge loading chamber and a take-up spool, the movement member moving said transparency from said transparency cartridge loading chamber to said take-up spool and said transparency feeding block extending between said transparency cartridge loading chamber and said take-up spool.

13. The image input apparatus of claim 12, wherein said transparency feeding block substantially covers said transparency between said transparency cartridge and said take-up spool at locations other than at said slit-shaped window.

14. The image input apparatus of claim 7, wherein said pressing member includes plural, spaced, semi-spherical shaped transparency presses.

15. The image input apparatus of claim 7, wherein said pressing member includes plural, spaced, ball bearings.

16. The image input apparatus of claim 7, wherein said pressing member includes spaced rails extending parallel to the movement direction.

17. An image input apparatus comprising:

illumination means for projecting light onto a transparency;

movement means for moving said transparency in a movement direction;

holding means for holding and covering said transparency;

a slit-shaped window formed in said holding means in a direction intersecting the direction of movement of said transparency;

image reading means for reading images on said transparency; and projection optical means for projecting light from said illuminated transparency to said image reading means, wherein said slit-shaped window has a sloping part inclined toward an optical axis of said projection optical means intersecting said transparency.

18. The image input apparatus of claim 17, wherein said window has a first window opening width adjacent the transparency and said sloping part defines an increasing window opening width in a direction from the transparency.

19. The image input apparatus of claim 17, further comprising cartridge loading means and take-up means, said movement means moving said transparency from said cartridge loading means to said take-up means and said holding means extending between said cartridge loading means and said take-up means.

20. The image input apparatus of claim 19, wherein said holding means substantially covers said transparency between said cartridge loading means and said take-up means at locations other than at said slit-shaped window.

21. An image input apparatus, comprising:

illumination means for projecting light onto a transparency;

movement means for moving said transparency in a movement direction;

holding means for holding and covering said transparency;

a slit-shaped window formed in said holding means in a direction intersecting the direction of movement of said transparency;

pressing means for pressing said transparency formed at the periphery of said slit-shaped window; and image reading means for reading images on said transparency visible through said slit-shaped window.

22. The image input apparatus according to claim 21, wherein said pressing means is formed with a ball-shaped part contacting said transparency.

23. The image input apparatus of claim 21, wherein said pressing means includes a rotating body.

24. The image input apparatus of claim 21, further comprising transparency cartridge loading means and take-up means, said movement means moving said transparency from said transparency cartridge loading means to said take-up means and said holding means extending between said transparency cartridge loading means and said take-up means.

25. The image input apparatus of claim 24, wherein said holding means substantially covers said transparency between said transparency cartridge loading means and said take-up means at locations other than at said slit-shaped window.

26. A method of reading a two-dimensional image using an image input apparatus having an illumination system, a movement member for moving a transparency thereon in a movement direction, a transparency feeding block that holds and covers the transparency, a slit-shaped window formed in the transparency feeding block in a direction intersecting the direction of movement of the transparency, an image reader, and a projection optical system, comprising the steps of:

a) moving the transparency through the transparency feeding block so that image recorded areas of the transparency are fed past the slit-shaped window;

b) illuminating the transparency as it is fed past the window; and c) projecting light from the illuminated transparency.

27. The method of claim 26, further comprising the steps of providing presser members near the window and pressing the transparency with the presser members during movement of the transparency to prevent curling.

28. The method of claim 26, further comprising a step of providing a sloping part in the window having two diverging surfaces to define a window opening width that increases the farther away from the transparency it is along the optical axis, and the projecting step projects the illuminated images without projecting reflected light from the sloping part.

* * * * *